July 7, 1959 A. B. MARTIN 2,893,639
ELECTRIC AND FUEL BURNING HEATING SYSTEM
Filed Nov. 7, 1955 6 Sheets-Sheet 1

INVENTOR.
Armor B. Martin
BY Gruthwells
Atty.

INVENTOR.
Armor B. Martin

July 7, 1959                    A. B. MARTIN                    2,893,639
                  ELECTRIC AND FUEL BURNING HEATING SYSTEM
Filed Nov. 7, 1955                                         6 Sheets-Sheet 4

INVENTOR.
Armor B. Martin
BY
 Atty.

July 7, 1959 A. B. MARTIN 2,893,639
ELECTRIC AND FUEL BURNING HEATING SYSTEM
Filed Nov. 7, 1955 6 Sheets-Sheet 5

INVENTOR.
Armor B. Martin
BY
Atty.

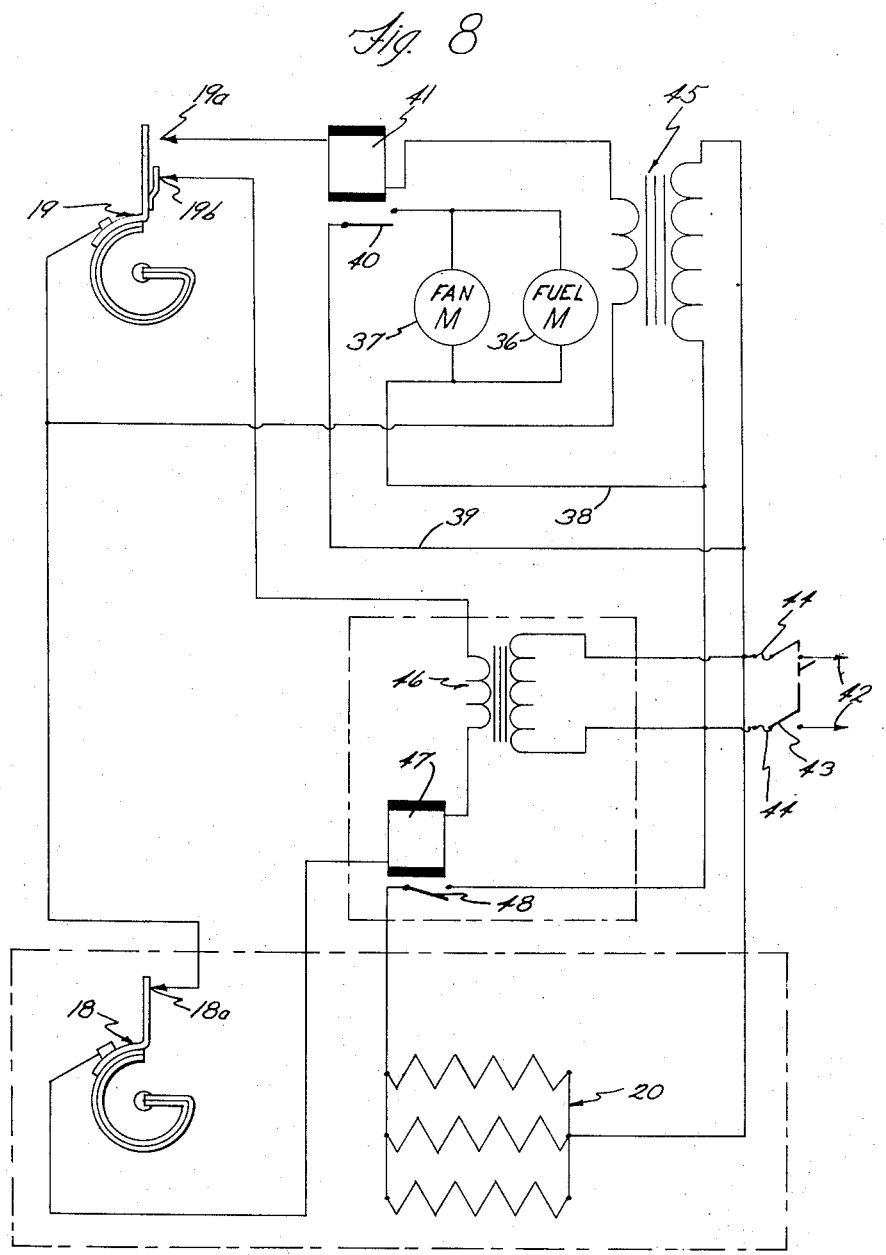

United States Patent Office 2,893,639
Patented July 7, 1959

2,893,639

ELECTRIC AND FUEL BURNING HEATING SYSTEM

Armor B. Martin, Spokane, Wash., assignor to Washington Water Power Company, Spokane, Wash., a corporation of Washington Application November 7, 1955, Serial No. 545,239

5 Claims. (Cl. 237—2)

My invention relates to an electric and fuel burning heating system. The principal purpose of my invention is to provide a heating system for space heating which utilizes an electric heater in combination with a fuel burning heater such as is commonly used in furnaces for space heating wherein the electric heater operates to maintain the air or other heat transmitting medium at the desired temperature in the space to be heated until the capacity of the electric heater is incapable of supplying sufficient heat to maintain the space at the desired temperature, and the fuel burning heater normally remains inactive so long as the electric heater is able to supply sufficient heat to maintain the space at the desired temperature, but is automatically energized to take over the supplying of heat to the space when the electric heater is unable to maintain the space at the desired temperature, the heat from the fuel burning heater thereafter operating to render the electric heater inoperative so long as the fuel burning heater is operating, the electric heater serving during periods when it is incapable of maintaining the space at the desired temperature as an instantaneous heat supply means for the space while the fuel burning heater is warming up after having been idle.

My invention contemplates the provision of a space heating system wherein a heating medium, such as air, is circulated by ducts between the space to be heated and a plenum chamber around a fuel burning heater unit such as an oil or gas furnace, or a furnace burning solid fuel such as coal. These furnaces are commonly equipped with suitable controls so that they are automatically kept in such condition that upon demand for heat in the space indicated by a drop in the space temperature below a certain level, the furnace will be placed in operation and will continue to supply heat to the space through the duct system until the temperature in the space rises above the predetermined temperature.

According to my invention I utilize an electric heater to supply heat to the space and maintain the space at or above the predetermined temperature within the limits of heat supply of the electric heater. In combination with the electric heater I employ a thermostat in the duct which transfers the heating medium from the plenum chamber to the space to be heated, which thermostat operates under the influence of the heat of the heating medium to de-energize the electric heater as soon as the furnace has increased the temperature of the heating medium flowing past the thermostat to a predetermined temperature. The thermostat operates also to close a point in the energizing circuit of the electric heater whenever the temperature of the heating medium flowing past the thermostat is below the predetermined temperature. The thermostat in the path of the heating medium from the furnace to the space to be heated cooperates with a thermostat in the space to be heated to control the off and on periods of the electric heater so that the electric heater is supplying heat to the space to be heated whenever the heating medium flow from the furnace to the space is below a predetermined temperature and the space temperature itself is below a predetermined level. The electric heater is turned off whenever the temperature in the space to be heated is above its predetermined level, or whenever the temperature of the heating medium from the furnace to the space is above the predetermined temperature.

The furnace normally is inoperative except for such operations as are necessary to keep the fire therein from going out so long as the space is maintained above a predetermined temperature. When the space temperature falls below this predetermined temperature, then the furnace is placed in operation and remains in operation until the space is above the predetermined temperature set to start the furnace regardless of whether the electric heater is also in operation at the same time.

In some furnaces, particularly those employing stokers which feed coal, briquettes, etc., the control system of the furnace causes it to start up and supply a certain amount of heat periodically in order to maintain a bed of fire in the furnace. Fluid fuel furnaces may be electrically ignited or may have pilot burners which normally are maintained burning at all times. According to my invention these normal controls and outdoor temperature responsive controls may be used in their usual manner with my improved system.

As illustrated in the drawing my invention is embodied in a heating system wherein a furnace having a shell around it and above it, supplies a heating medium such as air, from the plenum chamber between the furnace and the shell through a duct to a space to be heated. The space may be a single room or a plurality of rooms or enclosures, all receiving heat from the main duct leading from the furnace. In the heating duct I install a thermostat which is responsive to the temperature of the air as it leaves the furnace. In the space to be heated I install another thermostat which is responsive to the temperature in the space. An electric heater is so mounted that the heat it generates will be supplied to the space. The particular position of the electric heater may be varied. However, I prefer to place it in the duct which supplies the air from the furnace to the space to be heated.

The nature and advantages of my invention will be more apparent from the following detailed description and the accompanying drawings wherein a preferred form of the invention is shown. The drawings and description, however, are intended to be illustrative only and are not intended to restrict the scope of the invention except insofar as it is restricted by the claims.

In the drawings:

Figure 8 is a diagrammatic view illustrating the electrical connections of the system.

Figure 1:
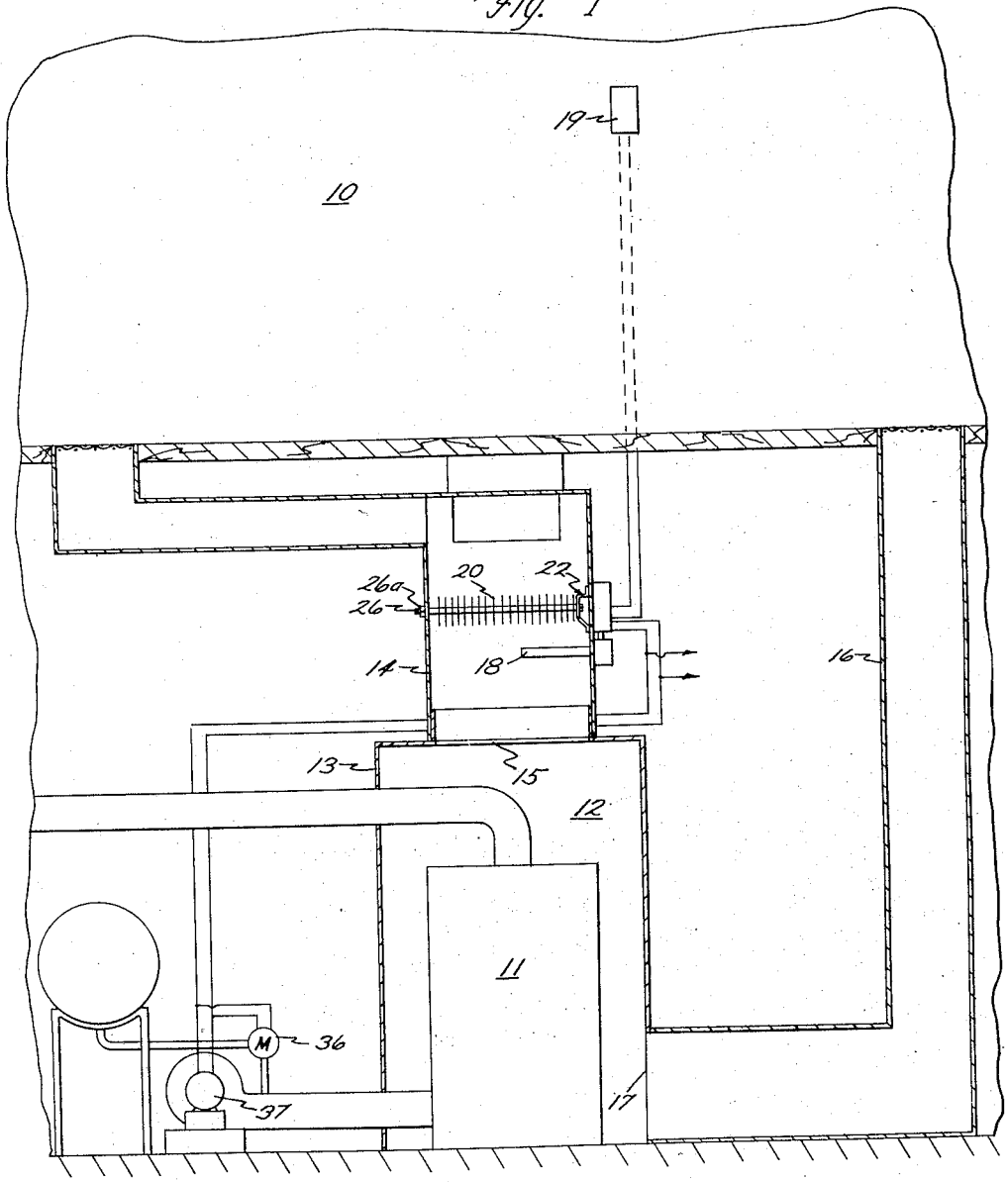
Figure 1 is a somewhat diagrammatic view illustrating the furnace, the duct for the heating medium leading from the furnace to a space to be heated, and the electric heater with the relative positioning of the control devices that are essential to my invention.
Figure 2:
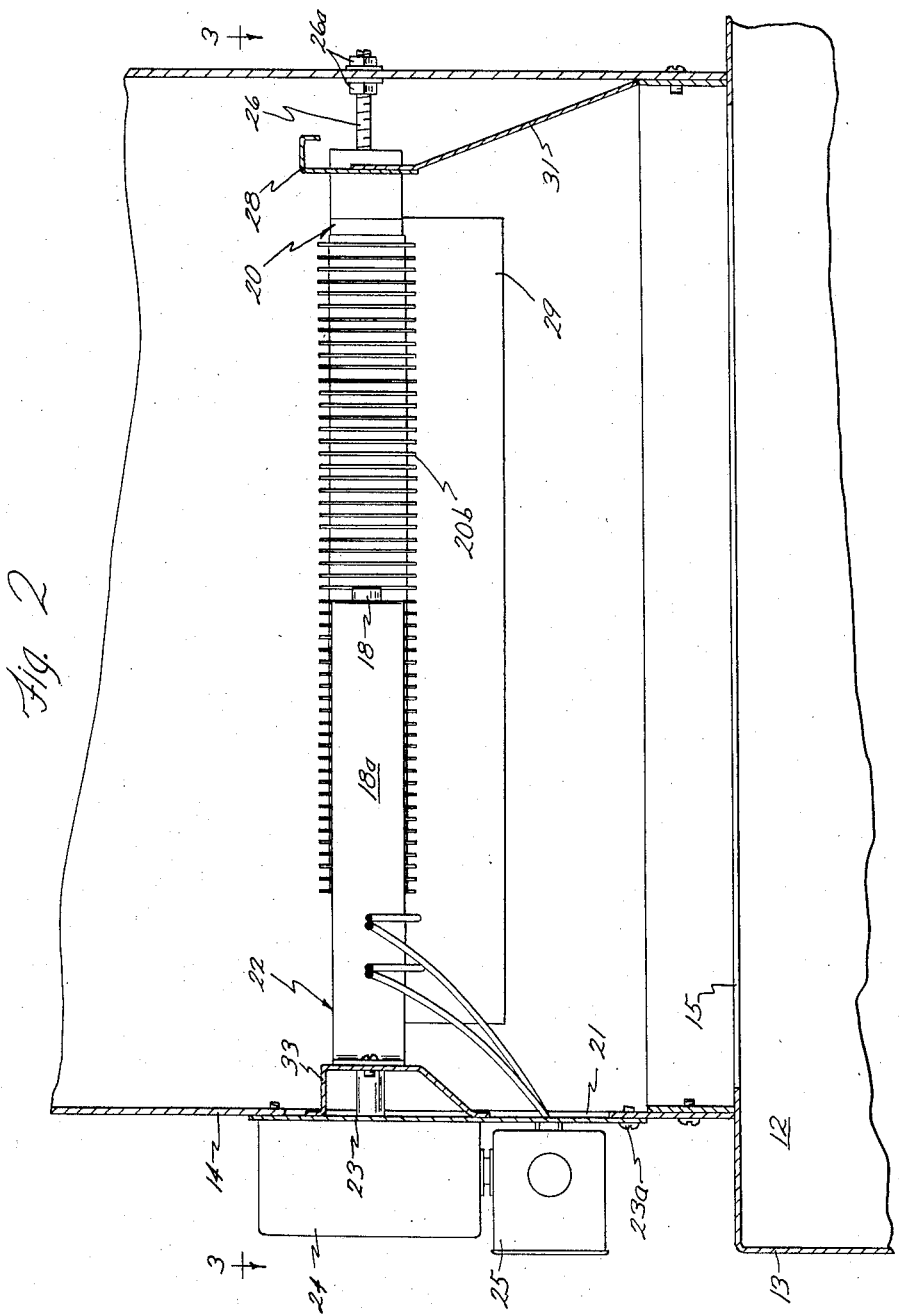
Figure 2 is an enlarged sectional view taken through the portion of the duct for the heating medium immediately above the furnace and illustrating the preferred installation of the electric heater and the thermostat which is responsive to the temperature of the heating medium leaving the furnace chamber, Figure 2 being taken substantially on the line 2—2 of Figure 3.
Figure 3:
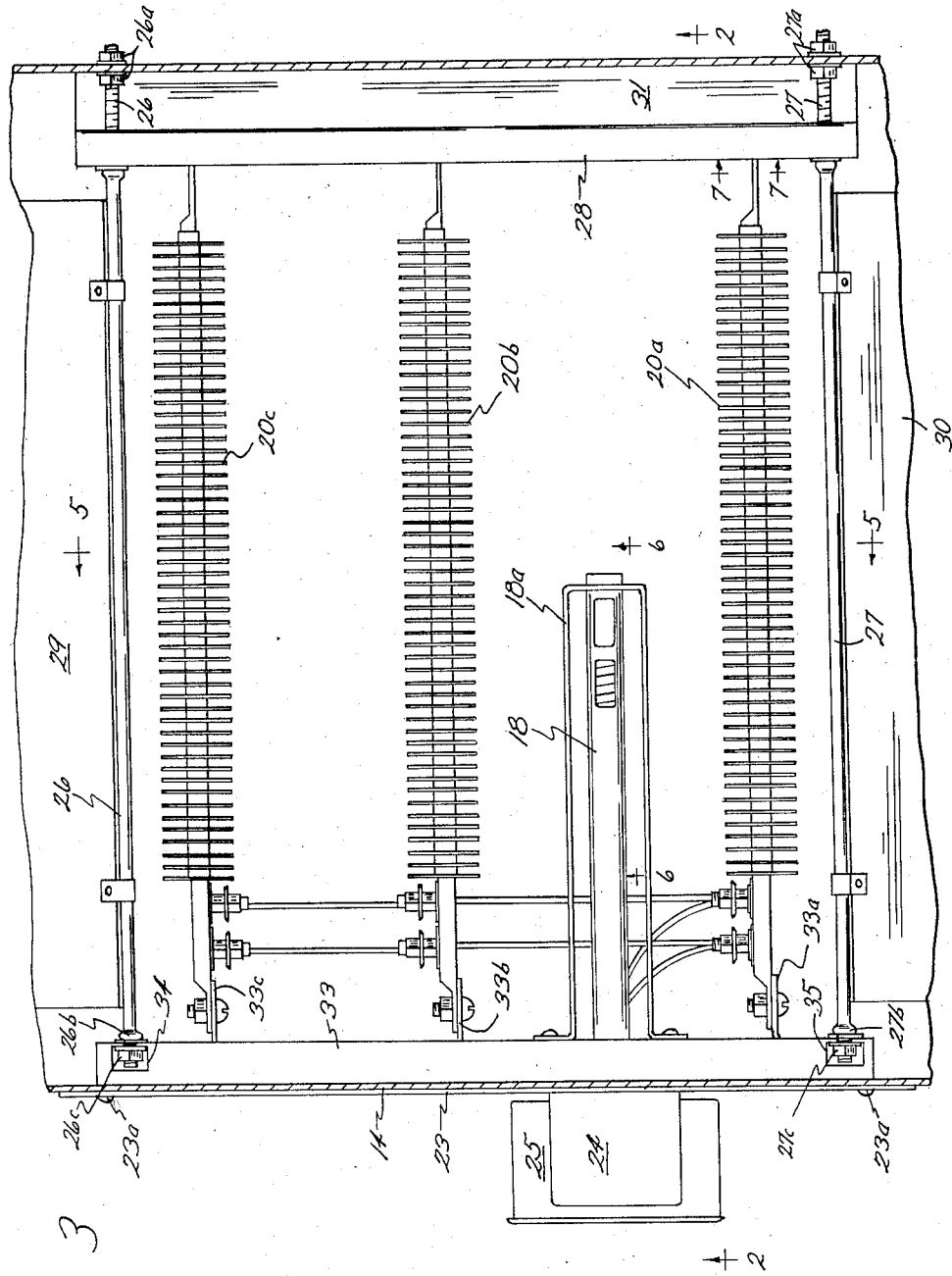
Figure 3 is a sectional view taken on the line 3—3 of Figure 2.
Figure 4:
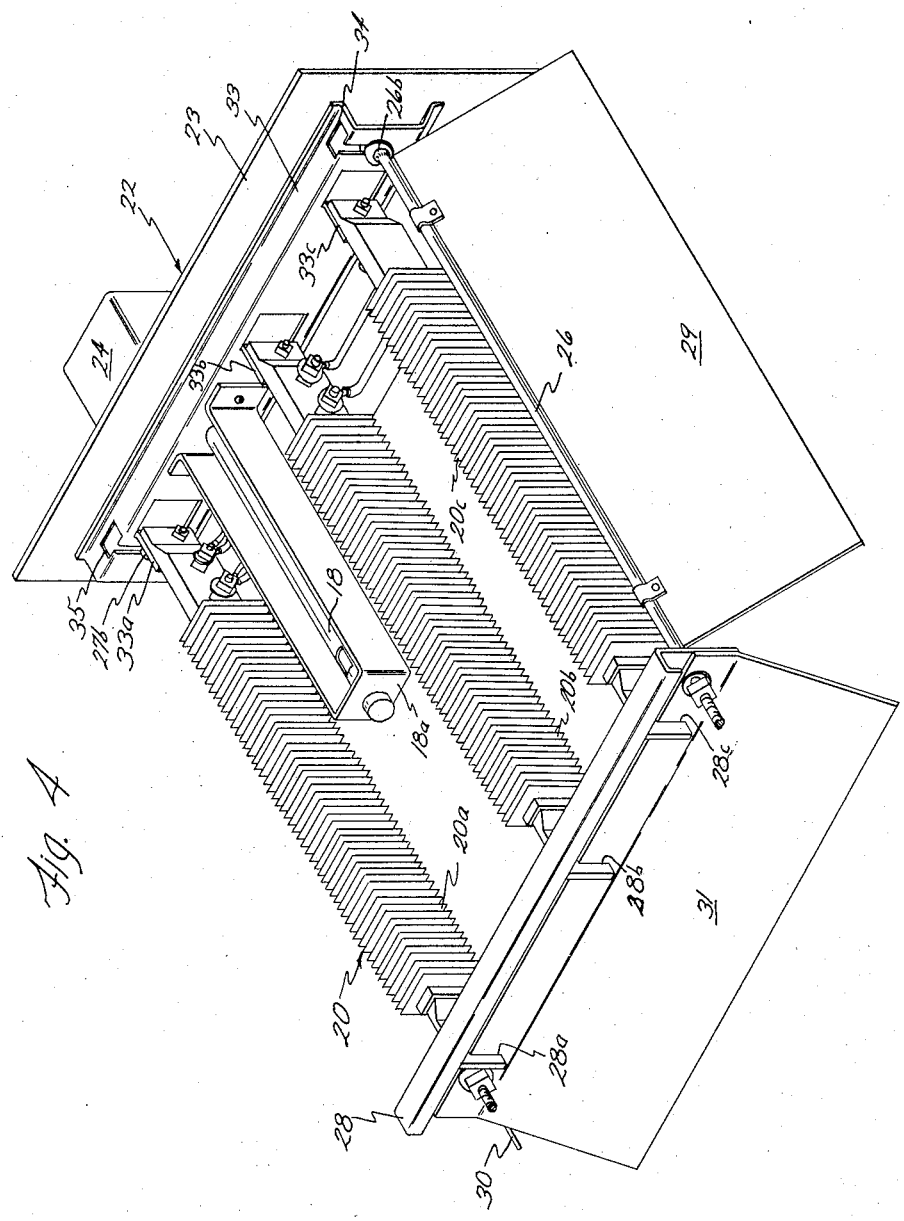
Figure 4 is a perspective view illustrating the electric heater.
Figure 5:
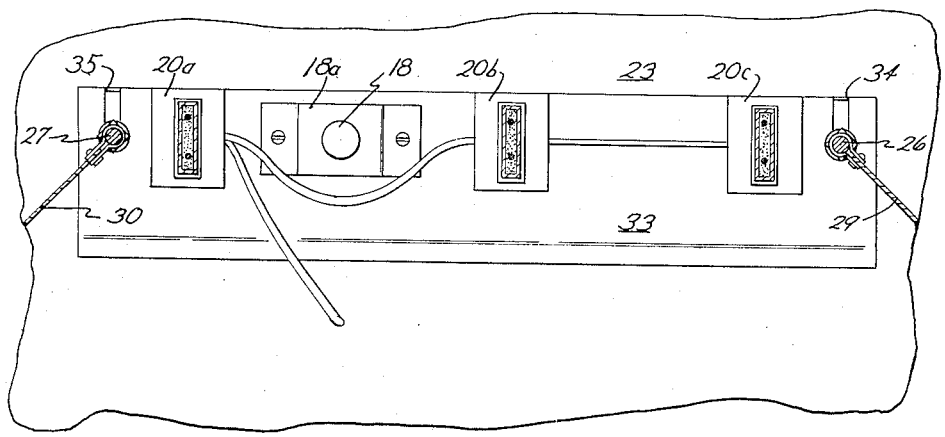
Figure 5 is a sectional view taken on the line 5—5 of Figure 3.
Figure 6:
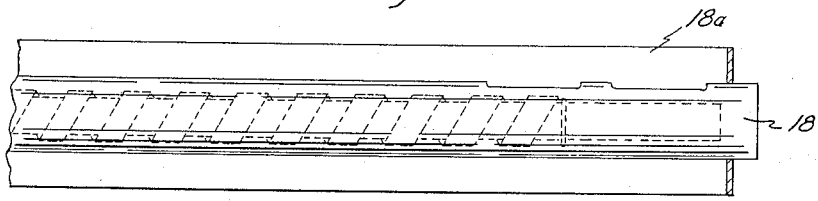
Figure 6 is an enlarged fragmentary sectional view taken on the line 6—6 of Figure 3.

Referring now in detail to the drawings and particularly to Figure 1, the numeral 10 indicates a space to be heated and the numeral 11 indicates generally a fuel burning furnace which has a plenum chamber 12 around it as defined by a shell 13. The chamber 12 is open to a duct 14 through an opening 15 in the top of the shell 13. Another duct 16 is adapted to take air from the space to be heated to the inlet 17 through the lower part of the shell 13 to the chamber 12. In the duct 14 immediately above the opening 15, I provide a thermostat 18 which is directly responsive to the temperature of the heating medium such as air passing upwardly through the duct 14 from the chamber 12. Within the space 10 to be heated, there is another thermostat 19 which is directly responsive to the temperature within the space 10. Other control thermostats may be used as pointed out hereinbefore but essentially they form no particular part of my invention and are therefore not indicated in the drawings.

An electric heater 20 is mounted in such a position as to supply heat to the space 10. In the preferred embodiment illustrated in the drawings, the heater 20 is mounted in the duct 14 and a common mounting is used for the heater 20 and the thermostat 18, however, this is not essential because the heater may be elsewhere in the system and the thermostat 18 may be mounted entirely separately from the heater 20. As a matter of mechanical convenience and economy, they are mounted together by cutting an opening 21 in the wall of the duct 14 and inserting a framework 22, which carries the thermostat 18 and the heater 20, into the duct 14.

The details of the frame 22, the heater 20 and the thermostat 18 are illustrated best in Figures 2 to 7.

The frame 22 is made up of a front plate 23 which carries outlet boxes 24 and 25 for the thermostat and the heater wiring mechanism, two side rods 26 and 27, a back bar 28 and deflecting plates 29 and 30 on the rods 26 and 27, and deflecting plate 31 on the bar 28. The rods 26 and 27 are adapted to be passed through apertures cut in the duct 14 and fastened by nuts 26a and 27a to the wall of the duct 14. The front plate 23 is fastened by screws 23a to the wall of the duct 14.

Figure 7:
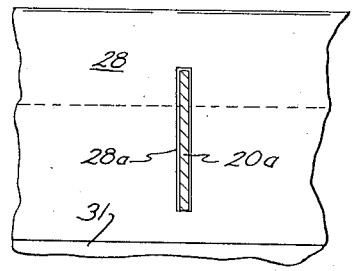
Figure 7 is an enlarged fragmentary sectional view taken on the line 7—7 of Figure 3.

The front plate 23 has a bracket 33 thereon. This bracket has notches 34 and 35 removably receiving the threaded ends 26b and 27b of the rods 27. These ends are provided with nuts 26c and 27c so that the rod ends may be clamped in the notches 34 and 35. The heater 20 is made up, as shown, of three elements 20a, 20b, and 20c which are finned to provide heat rediation. The elements are mounted to the bracket 33 by lugs 33a, 33b and 33c struck up from the bracket 33, the elements being bolted to the lugs. The bar 28 is slotted to receive the other ends of the elements 20a, 20b, and 20c, the slots 28a, 28b and 28c being slightly larger than the extended ends of the elements 20a, 20b, and 20c, as illustrated in Figure 7 of the drawings so that as the heating elements expand and contract they may adjust themselves with respect to the bar 28.

In order to protect the thermostat 18 from the heat radiating from the heater 20, I provide a shield 18a around the thermostat 18 and this shield is secured to the bracket 33.

In Figure 8 of the drawings the control mechanism is illustrated more in detail. The furnace is represented by a fuel motor 36 for supplying fuel such as oil to the furnace burner and by a fan motor 37 for supplying air to the furnace for combustion of the fuel. These motors are supplied with current from a suitable source by conductors 38 and 39, the conductor 39 having a normally open switch 40 therein which is adapted to be closed by energizing an electromagnet 41. The space thermostat 19 controls the energization of the electromagnet 41. When contact is made at 19a the furnace 11 is started up. When contact is broken at 19a the furnace 11 is stopped. The source of current is shown at 42. A main switch 43 is provided and fuses 44 are used for protection. A transformer 45 supplies the control current for the electromagnet 41.

The electric heater 20 is also supplied with current from the source 42 under joint control of the thermostats 18 and 19. A contact 19b is adapted to close, as the space 10 cools, at a slightly higher temperature than that at which contact is made at 19a. When the contact at 19b is made and the thermostat 18 has its contact 18a closed, a transformer 46 supplies current to an electromagnet 47 to close a switch 48. Current is supplied to the electric heater 20 from the source 42 when the switch 48 is closed. However, if the thermostat 18 is heated by hot air from the chamber 12 flowing up through the duct 14, the contact 18a will be broken and the electromagnet 47 cannot be energized by the closing of contact 19b alone. Thus the duct thermostat 18 can shut off the electric heater 20 and the thermostat 19 can shut off the heater 20, but the air in the duct 14 and the air in the space 10 must be cool enough to close both contacts 18a and 19b before the electric heater 20 can be turned on. However, any time that the contact 19a closes the furnace 11 is turned on.

As as specific example of operation, the thermostat 19 may be set to close the contact 19b when the space 10 gets down to 73 degrees F. The normally closed contact 18a of the thermostat 18 will allow competition of the circuit to energize the electromagnet 47. This will close the switch 48 and the electric heater 20 will immediately begin to supply heat to the air in the duct 14. The heated air will move up into the space 10 and thus tend to raise the temperature in the space 10 above 73 degrees F. If the heat supplied to the space is sufficient to raise the temperature there to 73½ degrees F. the contact at 19b will be broken and this will deenergize the electromagnet 47, allowing the switch 48 to open, and thus cut off current supply to the heater 20. So long as the electric heater 20 can keep the temperature of the space 10 above 72 degrees F. by the operation just described, it will furnish all of the heat, except the small amount of heat that may be produced by the pilot light or other furnace fire maintaining means.

Whenever the temperature of the space 10 drops to 72 degrees F., then the thermostat 19 will close contact 19a and this will cause the electromagnet 41 to close the switch 40 and start an igniter and the furnace fuel motor 36 and the fan motor 37. The electric heater 20 will remain energized until heat from the furnace 11 heats the air in the duct 14 high enough to cause the thermostat 18 to open its contact 18a, for example, a duct temperature of 120 degrees F. When contact 18a opens, the electromagnet 41 is deenergized and the switch 48 opens. The opening of the switch 48 cuts off current from the electric heater 20. As long as the furnace 11 keeps air in the duct 14 hot enough to maintain the contact 18a open, the electric heater 20 cannot be supplied with current. The furnace 11 will be shut off whenever the space temperature rises to 72½ degrees because the contact 19a will be opened, allowing switch 40 to open. When the duct 14 cools enough for the contact 18a to close, then the electric heater 20 is again under the sole control of the space thermostat 19 and will be turned on whenever the contact 19b is closed.

The thermostat 18 also serves as a high temperature cutout of the electric heater in case the duct becomes blocked or for any other reason the electric heater elements overheat by raising the temperature of the sensitive element of thermostat 18 above its set temperature of 120 degrees F.

It is believed to be evident from the foregoing description that the heating system provides a way of causing the electric heater 20 to perform two essential functions. First, the electric heater 20 takes all of the heat load necessary for the space 10 when temperatures are mild. Secondly, after the temperature drops so low that the electric heater cannot furnish all of the heat load necessary for the space 10, the electric heater 20 will act as a booster to supply heat immediately while the furnace is warming up after having been idle, and, to supply heat after the furnace is shut off, if the duct temperature drops below 120 degrees F. before the space temperature rises to 73½ degrees F. due to the heat from the furnace. Thus the electric heater 20 serves as a light load heater and a means to reduce the rise and fall rate that normally results from fuel furnace operation. All this is accomplished without necessity of circulating fans or where such fans are present, in addition to the effect of the fans.

If there should at any time be a failure of fuel or furnace, the electric heater 20 will stay on until not needed, or until the furnace is functioning again. This provides extra heat insurance against a freezeup while away from home.

The thermostat 19 is shown with two contacts 19a and 19b. It is evident that it might operate as a single stage thermostat to control a point in the starting circuits of both the electric heater and the furnace and the furnace circuit might have a separate control point under the control of another thermostat to keep the furnace from starting until it is needed. The present thermostat 19 is in effect the same as two thermostats, one controlling the supply of current to the heaters 20, while the other controls the fuel and air supply to the furnace. If the furnace is natural draft, only the fuel supply and dampers need to be controlled.

Having thus described my invention, I claim:

1. A space heating system comprising a main heating furnace including means for transferring heat from the furnace to the space to be heated operable to supply heat to said space, an auxiliary heater operable to supply heat to said space, thermostatic control means for said main heating furnace operatively responsive to temperature variations in said space to cause said furnace to supply heat to said space when the space temperature drops below a predetermined level and operable to cause said furnace to substantially cease supplying heat when the space temperature exceeds a predetermined level, second thermostatic control means for said auxiliary heater operably responsive to temperature variations in said space to cause said heater to supply heat when the space temperature drops below a predetermined level above the level at which said first named thermostatic control means causes said main furnace to supply heat and to cause said auxiliary heater to cease supplying heat when the space temperature exceeds a predetermined level at least as high as said last named predetermined level, and third thermostatic control means for said auxiliary heater operably responsive to temperature variations in the heat transferring means of said furnace to render said auxiliary heater inoperative when the temperature in said heat transferring means exceeds a predetermined level due to operation of the furnace.

2. The invention defined in claim 1 wherein said auxiliary heater comprises a heating coil heated by passage of electric current therethrough.

3. In a space heating system including a fuel furnace, a heat exchanger operatively connected therewith, means for circulating a heating medium from said heat exchanger to the space to be heated, and control means connected to the fuel furnace, said control means including a thermostatic control device responsive to temperature variations in the space operable to cause said furnace to supply heat when the space temperature drops below a predetermined level and to cause said furnace to cease supplying heat when the space temperature exceeds a predetermined level, the improvement comprising an auxiliary heater positioned to supply heat to said space, control means connected to said auxiliary heater operable to cause said heater to supply heat and operable to cause said heater to cease supplying heat, said control means including a first temperature sensitive control element responsive to temperature variations in said space operable to cause said heater to supply heat when the space temperature drops below a predetermined level above the level at which said thermostatic control device causes the fuel furnace to supply heat and to cause said heater to cease supplying heat when the space temperature exceeds a predetermined level at least as high as the last named level, and said auxiliary heater control means including a second temperature sensitive control element responsive to temperature variations in the heating medium caused by operation of the fuel furnace operable to cause said auxiliary heater to cease supplying heat when the temperature of said heating medium exceeds a predetermined amount due to operation of the furnace to supply heat.

4. The invention defined in claim 3 wherein said auxiliary heater comprises an electric heating coil positioned within the circulatory path of said heating medium between the heat exchanger and the space to be heated.

5. A space heating system having in combination means for circulating a heating medium between the space to be heated and a chamber where heat is supplied to the medium, a fuel furnace supplying heat to said chamber, an electric heater positioned in the circulatory path of the heating medium from the chamber to the space, and control means connected to said fuel furnace and said electric heater for operating said furnace and said heater in response to temperature variations, said control means comprising first and second thermostatic means responsive to temperature variations in the space to be heated, a first circuit including said first thermostatic means operably connected to said furnace to cause the furnace to supply heat when the space temperature passes below a predetermined level and operable to cause the furnace to reduce its heat supply when the space temperature rises above a predetermined level at least as high as said first named level, a second circuit including said second thermostatic means operably connected to said electric heater to energize said heater when the space temperature drops below a predetermined level above the level at which said first circuit causes the furnace to operate and operable to de-energize the electric heater when the space temperature rises to a predetermined level at least as high as said last named predetermined level, and third thermostatic means connected in said second circuit, said third thermostatic means being responsive to temperature variations in the heating medium caused by operation of said furnace and operable to de-energize said electric heater whenever the temperature of the heating medium between the chamber and the electric heater exceeds a predetermined level due to operation of the furnace.

References Cited in the file of this patent

UNITED STATES PATENTS

| | | |
|---|---|---|
| 2,137,581 | Nyler | Nov. 22, 1938 |
| 2,242,630 | Steingruber | May 20, 1941 |
| 2,416,766 | Miller et al. | Mar. 4, 1947 |
| 2,449,755 | Taylor | Sept. 21, 1948 |
| 2,525,400 | Crawford | Oct. 10, 1950 |
| 2,544,544 | Qualley et al. | Mar. 6, 1951 |
| 2,621,423 | Clark | Dec. 16, 1952 |
| 2,697,164 | Knapp et al. | Dec. 14, 1954 |
| 2,765,393 | Theisen | Oct. 2, 1956 |